Figure 1:
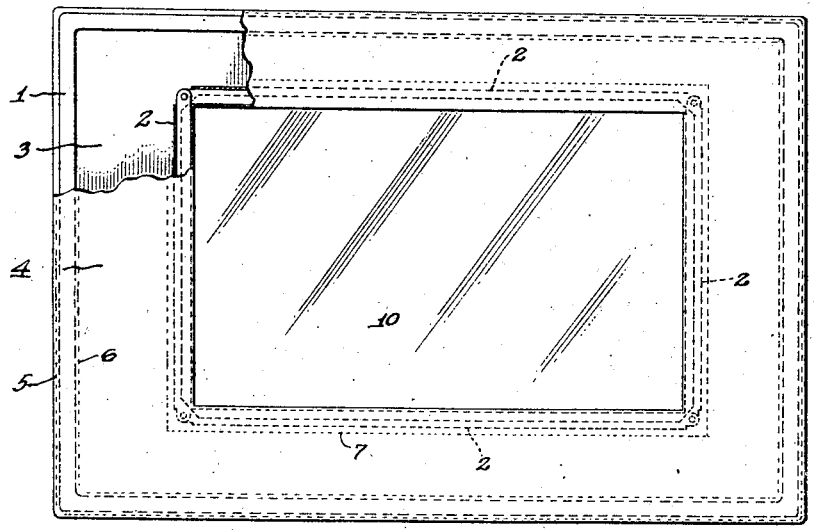

May 4, 1926.

W. C. LOUD 1,583,234

AUTOMOBILE CURTAIN

Filed Dec. 1, 1924

Inventor
William C. Loud,

By

Attorneys

Patented May 4, 1926.

UNITED STATES PATENT OFFICE.

WILLIAM C. LOUD, OF DETROIT, MICHIGAN, ASSIGNOR TO GLASSMOBILE COMPANY, OF DETROIT, MICHIGAN, A CORPORATION OF MICHIGAN.

AUTOMOBILE CURTAIN.

Application filed December 1, 1924. Serial No. 753,128.

*To all whom it may concern:*

Be it known that I, WILLIAM C. LOUD, a citizen of the United States, residing at Detroit, in the county of Wayne and State of Michigan, have invented certain new and useful Improvements in Automobile Curtains, of which the following is a specification, reference being had therein to the accompanying drawings.

This invention relates to the side or rear curtains of automobiles, either permanent or detachable and wherein a glass window is supported within an opening provided in a fabric or fabric-covered frame, such for example as side curtains of the type disclosed in my pending applications for Letters Patent, Serial No. 602,946, filed November 24, 1922, and Serial No. 673,236, filed November 7, 1923, or in Letters Patent No. 1,355,558, granted to me October 12, 1920, wherein the glass is peripherally enclosed by a sub-frame attached to, forming part of or separately suspended within an outer rigid frame enclosed in or forming the marginal portions of a side curtain.

In the prior patent applications referred to, provision is made for a certain flexibility of the inner frame with respect to the outer frame to provide for the absorbing of strains and the consequent minimizing of liability of the glass to be fractured in use or when the side curtain is being handled in storage or otherwise; and it is an object of this invention to provide efficient support of the glass perimetrically in a manner which will result in the effective cushioning of the edges thereof and incidental protection of the same against shock which might otherwise effect fracture of the glass; the invention being also directed towards the effecting of the suspension of the glass within its surrounding frame as distinguished from the mere peripheral enclosure thereof by such surrounding frame as has been usual in side curtain construction.

It is also an object of the said invention to provide for such peripheral suspension of the glass by flexible means within a frame or sub-frame enclosing the suspension means; and still further objects are to effect the cushioning of the peripheral edges of the glass relative to a surrounding frame of more or less rigid material in a manner relieving the said surrounding frame from the direct supporting of the glass there-within, and to provide in a curtain wherein the glass is housed in a surrounding frame and the frame mounted in a leather, fabric or similar curtain for the utilizing of the edges of the curtain contiguous to the opening of the said frame for the support of glass within the said frame, and the enclosing by the said frame of the stitched or connected edges of the fabric contiguous to the said opening of the said frame where such fabric is double and the frame is located between the layers thereof.

Still further objects subsidiary to or resulting from the aforesaid objects, or from the construction or operation of the invention as it may be carried into effect, will become apparent as the said invention is hereinafter further disclosed.

In carrying the said invention into effect, I may provide in a side curtain having outer and inner frames, the outer frame being intended to be applied to a vehicle and the inner frame to enclose a glass window, the inner frame being of inwardly opening channel configuration in cross section and of more or less rigid material such as of sheet metal; a fabric, leather or similar flexible curtain or cover extending over the said frames and having an opening therein corresponding to the glass window, the marginal portions of the curtain contiguous to the said opening being double and receiving the channel frame therebetween, the said marginal portions being folded inwardly into the said channel and protectively receiving the glass therebetween, and the edges of the said material being housed within the said channel frame and secured together around the perimeter of the glass whereby the said glass is suspended and held within the channel frame by the contiguous marginal portions of the said fabric and thereby protectively supported with respect to and within the said channel frame.

Figure 3:
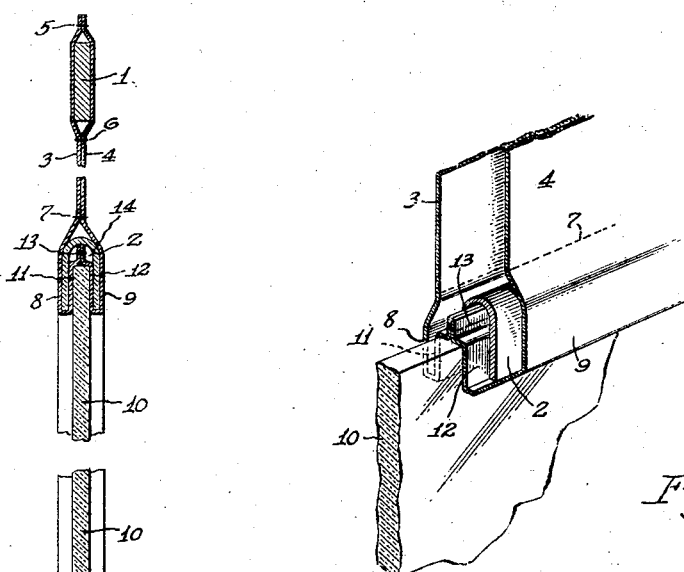
Figure 2:

All of which is more particularly described and ascertained hereinafter, by way of example, having reference to the accompanying drawing, wherein Figure 1 is an elevation of a side curtain embodying the said invention, part of the fabric covering being broken away to disclose the inner and outer frames;

Figure 2 is a broken transverse section of the said curtain drawn to a larger scale; and Figure 3 is a fragmentary perspective detail view illustrating the method of supporting the glass within the channel frame.

Similar characters of reference indicate similar parts in the several figures of the drawings.

The type of side curtain illustrated comprises an outer frame 1 which may be of metal, and an inner frame 2 which may also be of metal, the two frames being enclosed by a covering comprising layers 3 and 4 of fabric, leather or similar material which are secured by stitching 5 and 6 to the outer frame and are stitched together at 7 to provide inner marginal portions 8 and 9 between which the frame 2 is received, this frame 2 being of channel configuration in cross section and opening inwardly of the said frame to provide a housing for the perimetrical margins of a glass window 10.

Ordinarily, such glass windows have been directly inserted in the surrounding frames and, therefore, subject to vibration or shock from such frame, although it has been suggested to insert felt or other cushions in a window frame for the purpose of minimizing the danger of breakage of windows mounted therein, such cushioning means being, however, more or less of a make shift nature and not providing for the support of the glass in the complete manner suggested and disclosed in this application.

It will be seen that by my invention I provide for the full utilizing of the adjacent marginal portions of the fabric for the supporting of the glass window, the frame 2 being utilized as a reinforcing element and not directly as the supporting means for the glass, as has heretofore been usual, the inner margins of the said fabric being folded inwardly of the channel frame 2 as at 11 and 12 and the edges thereof secured together by stitching 13 around the perimeter of the glass, so that the marginal portions of the said glass are enclosed and supported by the contiguous margins of the fabric; and it will be obvious that if in the assembling of the curtain tension is put upon the fabric covering, as is effected to some extent when it is applied to the frames and is desirable to secure a curtain which is not duly flaccid, the tendency is to withdraw the margins 11 and 12 of the fabric from the enclosing channel frame so that the edges of the said fabric are more or less tensioned against the edges of the glass window, resulting in the suspension of the said window within the said channel frame: and even where such tension in the fabric is not provided, or where it is negligible, the nature of the fabric enclosure of the edges of the glass effectively prevents the bedding of the glass in the base of the channel frame due to the inability of the marginal portions 11 and 12 of the fabric to extend into the said frame beyond a predetermined extent, as will be readily understood. Consequently, a space 14 is provided in the channel frame around the edges of the glass and it will be apparent that shocks to which the said channel frame may be subjected will be considerably modified before being transmitted to the glass and danger of fracture of the said glass, such as is liable to occur in ordinary constructions, is considerably reduced.

The essence of this invention is in the supporting of the glass by the inward folding over the edges thereof of the contiguous margins of the fabric or similar curtain within a reinforcing frame, and the relative arrangement of the inner and outer frames or the shape or construction of the curtain proper is not material to the invention which may be developed within the scope of the following claims without departing from the essential features of the said invention; and it is desired that the specification and drawing be read as being merely illustrative and not in a limiting sense, except as necessitated by the prior art.

What I claim is:—

1. In a curtain, a body including two layers of flexible material having a window opening therein, a glass window, a window frame of channel form concealed between the said layers of material about said opening, said frame overlapping the margins of said glass, and the contiguous margins of said material being folded inwardly of said channel frame with their edges secured together around the perimeter of said glass.

2. In a curtain, a body including two layers of flexible material having a window opening therein, the margins of said material contiguous to said window opening being folded inwardly of the layers and secured together, a glass window supported between and by the said inwardly folded margins of said material, and a reinforcing frame embracing said margins.

3. A curtain according to claim 1 wherein means are provided preventing the entrance of the margins of the material into the channel frame beyond a desired extent.

4. A device according to claim 1 wherein the layers of material are stitched together around the said channel frame whereby the entrance of the margins of the fabric into the channel frame beyond a desired extent is prevented.

5. A curtain according to claim 2 wherein the reinforcing frame is of channel configuration and overlaps the margins of the window, said frame being of substantially greater dimensions than the said window whereby an appreciable space is provided between the perimeter of the window and the bed of the channel frame.

6. In a curtain, an outer frame, a body including two layers of flexible material attached to said frame and provided with a window opening, the margins of said frame contiguous to said opening being turned inwardly of said fabric and the edges thereof secured together, a glass window supported in said inwardly turned margins, and a channeled reinforcing frame of greater internal dimensions than said window embracing said margins within said body and held in spaced relation to the perimeter of said window by said material.

In testimony whereof I affix my signature.

WILLIAM C. LOUD.